United States Patent [19]
Sudmanns

[11] Patent Number: 5,109,674
[45] Date of Patent: May 5, 1992

[54] PISTON INTERNAL-COMBUSTION ENGINE HAVING A SUPERCHARGING OPERATION USING A GROUP OF SWITCHABLE EXHAUST GAS TURBOCHARGERS

[75] Inventor: Hans Sudmanns, Friedrichshafen, Fed. Rep. of Germany

[73] Assignee: MTU Motoren-Und Turbinen-Union Friedrichshafen GmbH, Fed. Rep. of Germany

[21] Appl. No.: 665,090

[22] Filed: Mar. 6, 1991

[30] Foreign Application Priority Data

May 19, 1990 [DE] Fed. Rep. of Germany ....... 4016214

[51] Int. Cl.$^5$ ............................................. F02B 37/00
[52] U.S. Cl. ..................................................... 60/612
[58] Field of Search ........................................... 60/612

[56] References Cited

U.S. PATENT DOCUMENTS

| | | | |
|---|---|---|---|
| 2,306,277 | 12/1942 | Oswald | 60/612 X |
| 2,387,560 | 10/1945 | Boulet | 60/612 X |
| 3,250,068 | 5/1966 | Vulliamy | 60/612 X |
| 4,400,945 | 8/1983 | Deutschmann et al. | 60/612 |

Primary Examiner—Michael Koczo
Attorney, Agent, or Firm—Evenson, Wands, Edwards, Lenahan & McKeown

[57] ABSTRACT

A piston internal-combustion engine, with an exhaust gas collector and a charge air collector, having a supercharging operation, has at least three exhaust gas turbochargers fastened next to one another to the side wall of a gas-tight box. The exhaust gas collector of the engine is connected with a first exhaust gas inlet of a first exhaust gas turbine of a first exhaust gas turbocharger. The first exhaust gas turbocharger is centrally located among the three exhaust turbochargers and an exhaust gas flow divider is rotatably arranged on the first exhaust gas outlet such that, in a first position, the exhaust gas flow divider connects the first exhaust gas outlet of the central exhaust gas turbocharger with the second exhaust gas inlets of the two adjacent exhaust gas turbochargers and, in a second position, the exhaust gas flow divider connects the first exhaust gas outlet of the central exhaust gas turbocharger directly to an exhaust pipe.

8 Claims, 2 Drawing Sheets

PISTON INTERNAL-COMBUSTION ENGINE HAVING A SUPERCHARGING OPERATION USING A GROUP OF SWITCHABLE EXHAUST GAS TURBOCHARGERS

BACKGROUND AND SUMMARY OF THE INVENTION

This invention relates to a piston internal-combustion engine and, more particularly, to a piston internal combustion engine operable in a supercharging manner by at least one group of switchable exhaust gas turbochargers.

For exhaust-gas-charged piston internal-combustion engines, the charging conditions in the partial-load operation of the engines can be improved in a known manner by operating several exhaust gas turbochargers. The exhaust gas turbochargers are operated in parallel when the offering of exhaust gas is high. Some of the exhaust gas turbochargers are shut down by blocking their exhaust gas feeding pipe when the amount of occurring exhaust gas is reduced. Thus, in the partial-load operation of the piston internal-combustion engine, the exhaust gas quantity is distributed to a small number of exhaust gas turbochargers. As a result, the exhaust gas turbochargers again operate in proximity of their design point and therefore with better efficiency. This results in a higher charge pressure, and makes available a larger amount of charge air. Because of the higher air excess, the combustion sequence is improved, the fuel consumption is lowered, and a smoke-free operation is achieved. This is also the case for piston internal-combustion engines which are designed for a higher medium pressure.

A known arrangement of this type is described in the German Patent Document DE 30 05 655 C2. The arrangement has the disadvantages resulting from the still considerable space requirement necessary because of the requirement of a finely graduated adaptation of the charge air supply to the offered exhaust gas during partial load of the piston internal-combustion engine. In particular, when the piston internal-combustion engines are of a small size, difficulties occur in the housing of several exhaust gas turbocharger groups.

There is therefore needed a group of switchable exhaust gas turbochargers which optimize the space requirement in connection with a finely graduated adaptation on the turbine side of the exhaust gas as well as on the compressor side to the charge air requirement of the piston internal-combustion engine.

According to the present invention, this need is met by at least three exhaust gas turbochargers fastened next to one another to the side wall of a gas-tight box. The exhaust gas collector of the engine is connected with a first exhaust gas inlet of a first exhaust gas turbine of the first exhaust gas turbocharger. The first exhaust gas turbocharger is centrally located among the three exhaust turbochargers and an exhaust gas flow divider is rotatably arranged on the first exhaust gas outlet such that, in a first position, the exhaust gas flow divider connects the first exhaust gas outlet of the central exhaust gas turbocharger with the second exhaust gas inlets of the two adjacent exhaust gas turbochargers and, in a second position, the exhaust gas flow divider connects the first exhaust gas outlet of the central exhaust gas turbocharger directly to an exhaust pipe. Because of the physical closeness of the three exhaust gas turbochargers disposed next to one another, on the compressor side as well as on the turbine side, very short line connections are obtained for the switching-together of the exhaust gas turbochargers among one another.

The present invention further provides an exhaust-gas switch-over device arranged between the exhaust gas collector and the first exhaust gas inlet of the central exhaust gas turbocharger, for full and partial loading of the first exhaust gas turbine.

Another advantage of the present invention includes the use of a charge-air switch-over device arranged in front of a first turbine wheel inlet of a first charge air compressor of the central exhaust gas turbocharger. The charge-air switch-over device includes an outflow connection corresponding with the first turbine wheel inlet; at least two inflow connections; and a closing part interacting with the at least two inflow connections.

In a preferred embodiment of the invention, one inflow connection of the charge-air switch-over device is arranged coaxially with respect to the outflow connection and the two other inflow connections are arranged approximately tangentially with respect to the outflow connection on the charge-air switch-over device.

A further advantage of the invention provides two flaps which, in a first position, close off the one coaxial inflow connection, and, in a second position, block off the two other tangential inflow connections.

Yet another embodiment of the present invention comprises second charge air pressure lines of the two adjacent exhaust gas turbochargers which are connected with one of the at least two inflow connections of the charge-air switch-over device. A first charge air pressure line of the central exhaust gas turbocharger is connected with a charge air collector of the piston internal-combustion engine.

The principal advantages achieved by the invention are that a very compact arrangement of a group of switchable exhaust gas turbochargers, together with all lines and switching elements, is obtained. Further, by means of this arrangement, a charge air supply of the piston internal-combustion engine is achieved that can be switched in multiple steps, and that the advantages of the variable charge air supply can be utilized also for small sized piston internal-combustion engines.

Other objects, advantages and novel features of the present invention will become apparent from the following detailed description of the invention when considered in conjunction with the accompanying drawings.

DETAILED DESCRIPTION OF THE DRAWINGS

Figure 1:
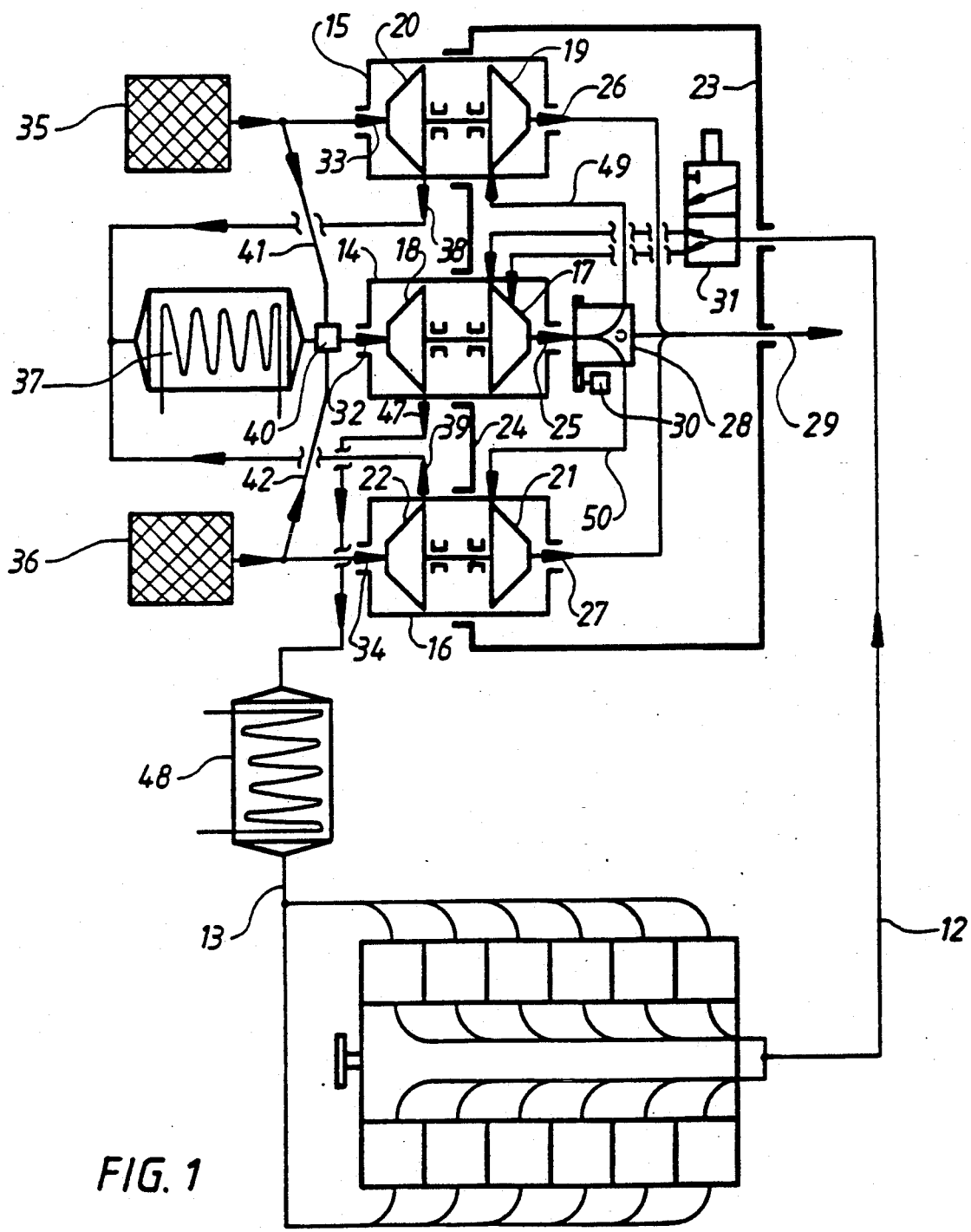
FIG. 1 is a schematic representation of the piston internal-combustion engine of the present invention having a group of switchable exhaust gas turbochargers.

Referring to FIG. 1, a piston internal-combustion engine 11, having several cylinders arranged in two banks is connected to a group of switchable exhaust gas turbochargers 14, 15, 16 via an exhaust gas collector 12 and a charge air collector 13. Each exhaust gas turbocharger 14, 15, 16 includes an exhaust gas turbine 17, 19, 21 having one turbine housing. Further, each exhaust gas turbocharger 14, 15, 16 includes a charge air compressor 18, 20, 22 having one compressor housing. The exhaust gas turbochargers 14, 15, 16 in the group are placed together by means of a gas-tight box 23 located on the piston internal-combustion engine 11. The exhaust gas turbochargers 14, 15, 16 are situated next to one another and are fastened to a side wall 24 of the box 23. The turbine housings for each of the exhaust gas turbochargers 14, 15, 16, in this example, are situated inside the box 23 while the compressor housings are situated outside of the box 23.

The exhaust gas collector 12 is connected with the exhaust gas inlet of the exhaust gas turbine 17 of the centrally located exhaust gas turbocharger 14. At the exhaust gas outlet 25 of the central exhaust gas turbocharger 14, an exhaust gas flow divider 28 is arranged. The gas flow divider 28 can be rotated around the axis of its exhaust gas inlet opening and can be adjusted in two positions which are rotated by 90° with respect to one another. In this case, the exhaust gas flow divider 28, in a first position according to FIG. 1, connects the exhaust gas outlet 25 of the central exhaust gas turbocharger 14 with the exhaust gas inlets 49, 50 of the two adjacent exhaust gas turbochargers 15, 16. This first position of the exhaust gas flow divider 28, which is adjusted during the full-load operation of the piston internal-combustion engine 11, causes a two-stage supercharging by means of the central exhaust gas turbocharger 14 as the first stage, and the two parallel-operating exhaust gas turbochargers 15, 16 as the second stage.

Figure 1A:
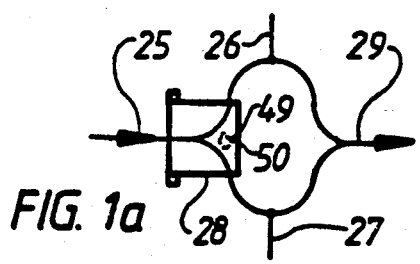
FIG. 1a is an exhaust gas flow divider in a position that is rotated by 90° with respect to FIG. 1.

Referring to FIG. 1A, there is shown the second position of the exhaust gas flow divider 28. The gas flow divider 28 is adjusted during idling or partial-load of the piston internal-combustion engine 11. In the second position, the exhaust gas outlet 25 of the central exhaust gas turbocharger 14 is directly connected with the exhaust pipe 29. The exhaust gas supply of the two exhaust gas turbochargers 15, 16 is therefore interrupted so that the supercharging takes place in only one stage solely by means of the central exhaust gas turbocharger 14. A controllable rotary drive 30 is provided for the adjustment of the exhaust gas flow divider 28.

The exhaust gas outlets 26, 27 of the outer exhaust gas turbochargers 15 16 are permanently connected with the exhaust pipe 29.

The exhaust gas turbine 17 of the central exhaust gas turbocharger 14 is equipped with an exhaust-gas switch-over device 31 in the exhaust gas inlet. The exhaust gas switch-over device 31 permits a partial or full loading of the exhaust gas turbine 17 corresponding to the exhaust gas offered by the piston internal-combustion engine 11. In this manner, the exhaust gas turbine 17 can be driven with good efficiency, even when the exhaust gas offered from the internal combustion engine changes. Further, the exhaust gas turbine 17, relative to the exhaust gas mass flow, can be driven with high performance.

Figure 2:
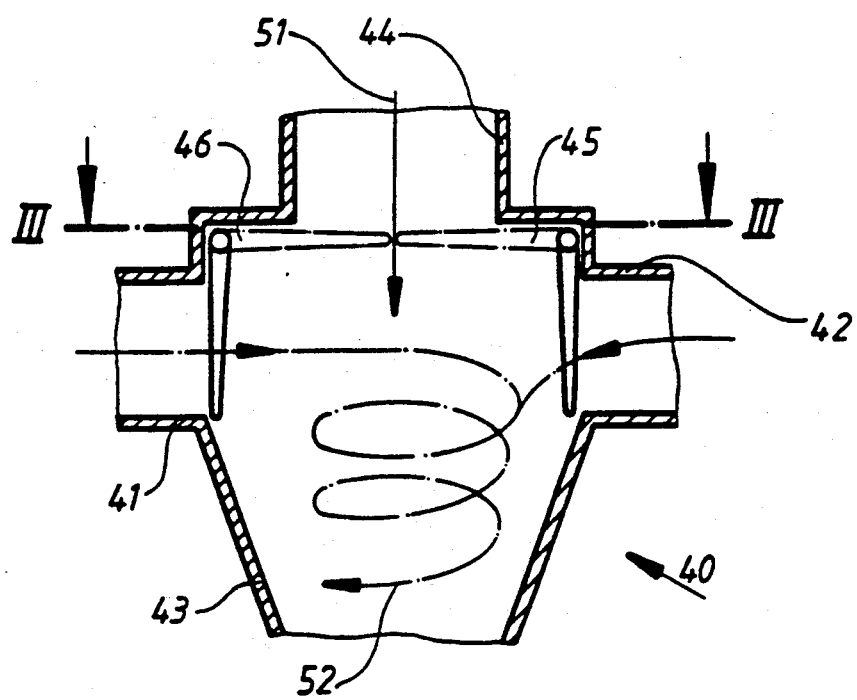
FIG. 2 is a longitudinal sectional view of the charge air switch-over device according to Line II—II in FIG. 3.

An intake air filter 35, 36 is assigned to each intake line 33, 34 of each of the two outer exhaust gas turbochargers 15, 16. In front of the inlet 32 of the charge air compressor 18 of the central exhaust gas turbocharger 14, a charge-air switch-over device 40 is arranged. As shown in FIG. 2, the charge-air switch-over device 40 has an outflow connection 43 corresponding to the inlet 32, an inflow connection 44 coaxial to the outflow connection 43, two inflow connections 41, 42 tangential to the outflow connection 43, and a controllable closing part which consists of flaps 45, 46. The flaps 45, 46 are equipped with a torsion spring such that, under the effect of the torsion spring, the flaps 45, 46 endeavor to take up the position indicated by the dash-dotted line.

Referring back to FIG. 1, the tangential inflow connections 41, 42 are each connected to the adjacent intake lines 33, 34 downstream of the intake air filters 35, 36. The coaxial inflow connection 44 is connected with the air outlet of a charge air intercooler 37. The charge air pressure lines 38, 39 of the two exhaust gas turbochargers 15, 16 lead into the charge air intercooler 37, and the charge air pressure line 47 of the central exhaust gas turbocharger 14 leads to another charge air cooler 48, from which the charge air collector 13 originates.

The position of the flaps 45, 46 occurring during the engine operation is a function of the loading of the exhaust gas turbochargers 14, 15, 16 which is a result of the position of the exhaust gas flow divider 28.

In the position of the exhaust gas flow divider 28 illustrated in FIG. 1 corresponding to the full-load operation of the piston internal-combustion engine 11, the two exhaust gas turbochargers 15, 16 are operative. The charge air, which is then pre-compressed in the charge air compressors 20, 22, by way of the charge air pressure lines 38, 39, arrives in the charge air intercooler 37, and subsequently in the coaxial inflow connection 44 of the charge-air switch-over device 40. Under the effect of this charge air flow 51, the flaps 45, 46 swivel into the solid line position shown in FIG. 2. In this case, the tangential inflow connections 41, 42 are closed by the flaps 45, 46, and the pre-compressed charge air arrives in the charge air compressor 18 of the exhaust gas turbocharger 14 in a non-rotating manner. In this manner, a two-stage charging is obtained, with the exhaust gas turbochargers 15, 16 as the low-pressure stage, and the exhaust gas turbocharger 14 as the high-pressure stage.

During idling and partial load of the piston internal-combustion engine 11, the exhaust gas flow divider 28 is in the position illustrated in FIG. 1a. The exhaust gas turbochargers 15, 16 are then no longer acted upon by exhaust gas and are inoperative. The charge air supply of the piston internal-combustion engine 11 therefore takes place only by means of the central exhaust gas turbocharger 14. Thus, the charge air delivery of the exhaust gas turbochargers 15, 16 is absent, and therefore also absent is the charge air current 51 in the coaxial inflow connection 44 of the charge-air switch-over device 40. As a result, the flaps 45, 46, under the effect of the torsion springs, swivel back into their inoperative position indicated by a dash-dotted line, and expose the mouths of the tangential inflow connections 41, 42. This swiveling-back of the flaps 45, 46 is promoted by the intake vacuum in the outflow connection 43 generated by the charge air compressor 18 of the exhaust gas turbocharger 14. The charge air compressor 18 of the exhaust gas turbocharger 14 can now take in air from the environment, by way of the tangential inflow connections 41, 42 and the intake air filters 35, 36.

Figure 3:
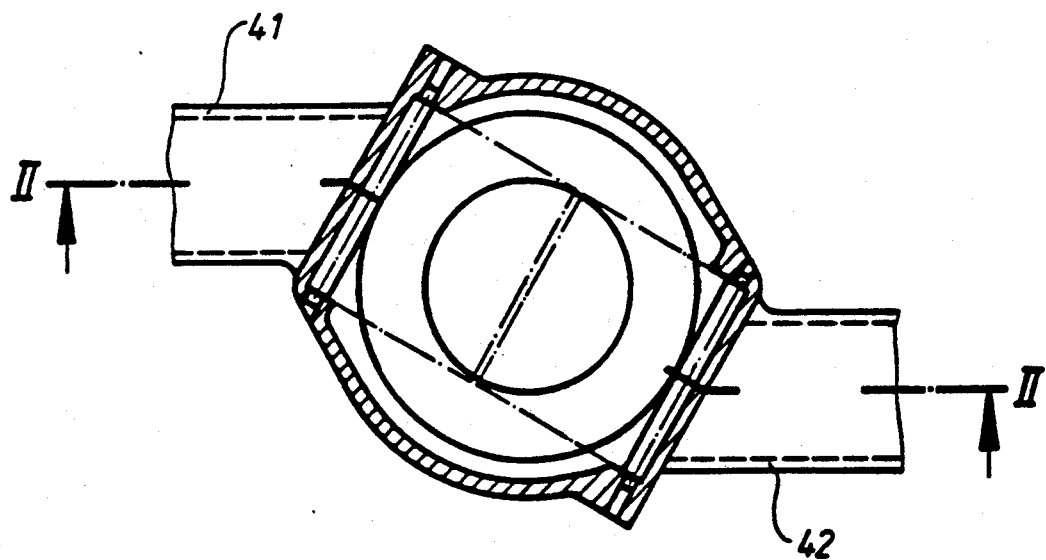
FIG. 3 is a cross-sectional view of the charge air switch-over device according to Line III—III in FIG. 2.

The tangential discharge area of the two inflow connections 41, 42 into the charge-air switch-over device 40 is arranged offset from one another according to FIG. 3 such that a rotational flow 52 occurs in the outflow connection 43 and thus in the turbine wheel inlet 32. The flow direction is the same as the rotating direction of the rotor runner of the exhaust gas turbocharger 14. A faulty flow against the blades of the charge air compressor 18 occurs in this operating condition of the piston internal-combustion engine and the exhaust gas turbocharger 14 as a result of the low air mass flow. This faulty flow is compensated by the pre-rotation. As a result, the charge air compressor 18 operates at optimal efficiency and with a characteristic compressor diagram which is widened in the direction of a reduced mass flow.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A piston internal-combustion engine, with an exhaust gas collector and a charge air collector, having a supercharging operation, comprising:
   at least one group of switchable exhaust gas turbochargers, each exhaust gas turbocharger in said at least one group including:
   a turbine housing;
   an exhaust gas turbine operatively arranged in said turbine housing;
   a charge air compressor housing; and
   a charge air compressor operatively arranged in said compressor housing;
   a gas-tight box having a side wall for fastening together said at least one group of exhaust gas turbochargers to the piston internal-combustion engine wherein said turbine housing for each exhaust gas turbocharger is disposed inside said gas-tight box and said compressor housing for each exhaust gas turbocharger is disposed outside the gas-tight box;
   at least a first exhaust gas turbine of a first exhaust gas turbocharger having a first exhaust gas outlet being connected with second exhaust gas inlets of second exhaust gas turbines having second exhaust gas outlets;
   an exhaust pipe coupled to jointly connected second exhaust gas outlets;
   wherein said at least one group comprises three exhaust gas turbochargers fastened next to one another to the side wall of said gas-tight box, the exhaust gas collector being connected with a first exhaust gas inlet of the first exhaust gas turbine of the first exhaust gas turbocharger;
   wherein said first exhaust gas turbocharger is centrally located in said at least one group of exhaust gas turbochargers; and
   an exhaust gas flow divider rotatably arranged on the first exhaust gas outlet such that, in a first position, said exhaust gas flow divider connects the first exhaust gas outlet of the central exhaust gas turbocharger with the second exhaust gas inlets of the two adjacent exhaust gas turbochargers and, in a second position, said exhaust gas flow divider connects the first exhaust gas outlet of the central exhaust gas turbocharger directly to said exhaust pipe.

2. A piston internal-combustion engine according to claim 1, further comprising an exhaust-gas switch-over device arranged between the exhaust gas collector and the first exhaust gas inlet of the central exhaust gas turbocharger, for full and partial loading of the first exhaust gas turbine.

3. A piston internal-combustion engine according to claim 1, further comprising a charge-air switch-over device arranged in front of a first inlet of a first charge air compressor of the central exhaust gas turbocharger, said charge-air switch-over device including an outflow connection corresponding with the first inlet; at least two inflow connections; and a closing part interacting with said at least two inflow connections.

4. A piston internal-combustion engine according to claim 3, wherein one inflow connection of the charge-air switch-over device is arranged coaxially with respect to the outflow connection.

5. A piston internal-combustion engine according to claim 4, wherein two other inflow connections are arranged approximately tangentially with respect to the outflow connection on the charge-air switch-over device.

6. A piston internal-combustion engine according to claim 5, wherein the closing part comprises two flaps which, in a first position, close off said one coaxial inflow connection, and, in a second position, block off said two other tangential inflow connections.

7. A piston internal-combustion engine according to claim 5, wherein said two other tangential inflow connections are each connected with an intake pipe of the two adjacent exhaust gas turbochargers.

8. A piston internal-combustion engine according to claim 3, further comprising second charge air pressure lines of the two adjacent exhaust gas turbochargers which are connected with one of said at least two inflow connections of the charge-air switch-over device, and a first charge air pressure line of the central exhaust gas turbocharger which is connected with a charge air collector of the piston internal-combustion engine.

* * * * *